United States Patent
Kumagai et al.

(10) Patent No.: US 9,325,606 B2
(45) Date of Patent: Apr. 26, 2016

(54) COMMUNICATION SYSTEM, COMMUNICATION ROUTE CONTROL METHOD, AND COMMUNICATION APPARATUS

(75) Inventors: Atsushi Kumagai, Tokyo (JP); Masayuki Miura, Tokyo (JP); Kunio Odaka, Tokyo (JP); Kazutaka Shimoosako, Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 112 days.

(21) Appl. No.: 14/232,066

(22) PCT Filed: Jul. 12, 2012

(86) PCT No.: PCT/JP2012/067851
§ 371 (c)(1),
(2), (4) Date: Mar. 5, 2014

(87) PCT Pub. No.: WO2013/008890
PCT Pub. Date: Jan. 17, 2013

(65) Prior Publication Data
US 2014/0198633 A1  Jul. 17, 2014

(30) Foreign Application Priority Data
Jul. 12, 2011 (JP) ................................ 2011-153814

(51) Int. Cl.
*H04J 3/14* (2006.01)
*H04L 12/28* (2006.01)
(Continued)

(52) U.S. Cl.
CPC .............. *H04L 45/22* (2013.01); *H04L 12/462* (2013.01); *H04L 41/0816* (2013.01); *H04L 43/0811* (2013.01)

(58) Field of Classification Search
CPC ........ H04L 12/28; H04L 45/025; H04L 45/04; H04L 43/50; H04J 3/14
See application file for complete search history.

(56) References Cited

U.S. PATENT DOCUMENTS 6,535,498 B1   3/2003  Larsson et al.
8,665,841 B1 *  3/2014  Goel ............................. 370/338
(Continued)

FOREIGN PATENT DOCUMENTS

EP    1856853 A1   11/2007
EP    2296326 A1    3/2011
(Continued)

OTHER PUBLICATIONS

Japan Application No. 2013-523985; Decision of Refusal; dated Jul. 7, 2014; 4 pages.
(Continued)

*Primary Examiner* — Andrew Lee
(74) *Attorney, Agent, or Firm* — Baker & Hostetler LLP

(57) ABSTRACT

A communication system that performs communication route control includes a center node and at least one node connected thereto via a communication line. The node includes an error-detecting unit that detects an error in the communication route, a route request packet transmitting unit that broadcasts a new route request packet in response to the detection, a route answer packet receiving unit that receives a route answer packet transmitted from a node that is a target node or a node having a valid route to the target node or from the center node, and a communication route updating unit that updates a communication route based on the route answer packet. A node that is the target node or the node having a valid route to the target node or the center node transmits a route answer packet to the node in response to a route request packet transmitted from the node.

15 Claims, 11 Drawing Sheets

(51) Int. Cl.
*H04L 12/707* (2013.01)
*H04L 12/24* (2006.01)
*H04L 12/26* (2006.01)
*H04L 12/46* (2006.01)

(56) References Cited

U.S. PATENT DOCUMENTS

| | | | |
|---|---|---|---|
| 2006/0239061 A1* | 10/2006 | Iwanari | 365/145 |
| 2007/0091796 A1* | 4/2007 | Filsfils et al. | 370/228 |
| 2007/0099563 A1* | 5/2007 | Amemiya et al. | 455/14 |
| 2008/0031257 A1* | 2/2008 | He | 370/395.31 |
| 2008/0175587 A1* | 7/2008 | Jensen | 398/2 |
| 2008/0198764 A1* | 8/2008 | Keller | 370/254 |
| 2009/0168787 A1* | 7/2009 | Ansari et al. | 370/401 |
| 2009/0245099 A1* | 10/2009 | Tsuchiya | 370/221 |
| 2010/0034205 A1* | 2/2010 | Kusama et al. | 370/400 |
| 2010/0290441 A1* | 11/2010 | Stewart | 370/338 |
| 2011/0145374 A1* | 6/2011 | Lee | 709/220 |
| 2012/0275490 A1* | 11/2012 | Courtice | 375/133 |

FOREIGN PATENT DOCUMENTS

| | | |
|---|---|---|
| IN | 6697/DELNP/2007 | 9/2007 |
| JP | H07-031082 | 1/1995 |
| JP | 2005-210818 | 8/2005 |
| WO | WO 2006/098723 A1 | 9/2006 |
| WO | WO 2006/131130 A1 | 12/2006 |

OTHER PUBLICATIONS

European Patent Application No. 12811697.7; Extended European Search Report; dated Feb. 2, 2015; 11 pages.
Japan Application No. 2013-523985; Office Action; dated Jan. 5, 2015; 4 pages.
Japan Application No. 2013-523985; Office Action; dated Apr. 7, 2014; 4 pages.
Japan Patent Application No. 2013-523985; Decision to Grant; dated Jul. 6, 2015; 5 pages.
Yasuyo Nishimura, Hideki Bannai, Akifumi Yonehara, Satoshi Hasegawa, "A study on autonomous network restoration algorithms IN89-70", IEICE Technical Report, vol. 89, No. 262, The Institute of Electronics, Information and Communication Engineers, Oct. 27, 1989, pp. 7-12.
International Application No. PCT/JP2012/067851, International Search Report dated Aug. 7, 2012, 3 pages.
China Patent Application No. 201280029742.6; Office Action; dated Nov. 27, 2015; 23 pages.
European Patent Application No. 12811697.7; Office Action Article 94(3);dated Jan. 5, 2016, 7 pages.

* cited by examiner

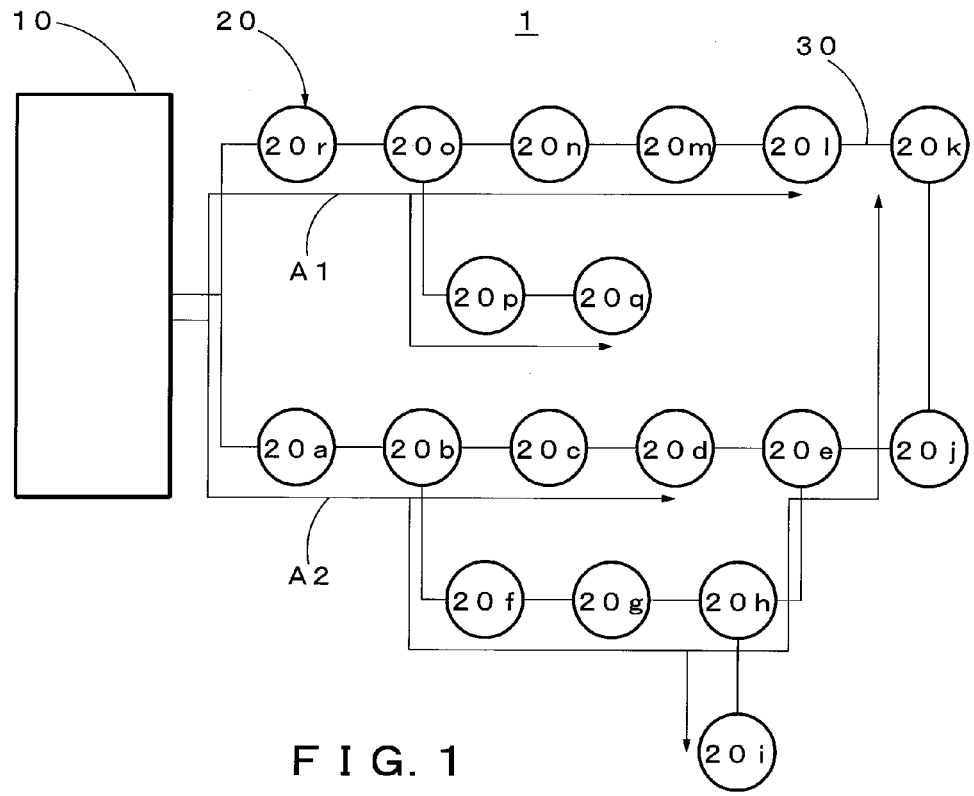
F I G. 1
| TARGET NODE | NEIGHBOR NODE | COMMUNICATION COST |
|---|---|---|
| PARENT NODE 1 | CHILD NODE 1 | 10 |
| CHILD NODE 2 | CHILD NODE 3 | 4 |
| ⋮ | ⋮ | ⋮ |
| CHILD NODE 5 | CHILD NODE 5 | 1 |
F I G. 3

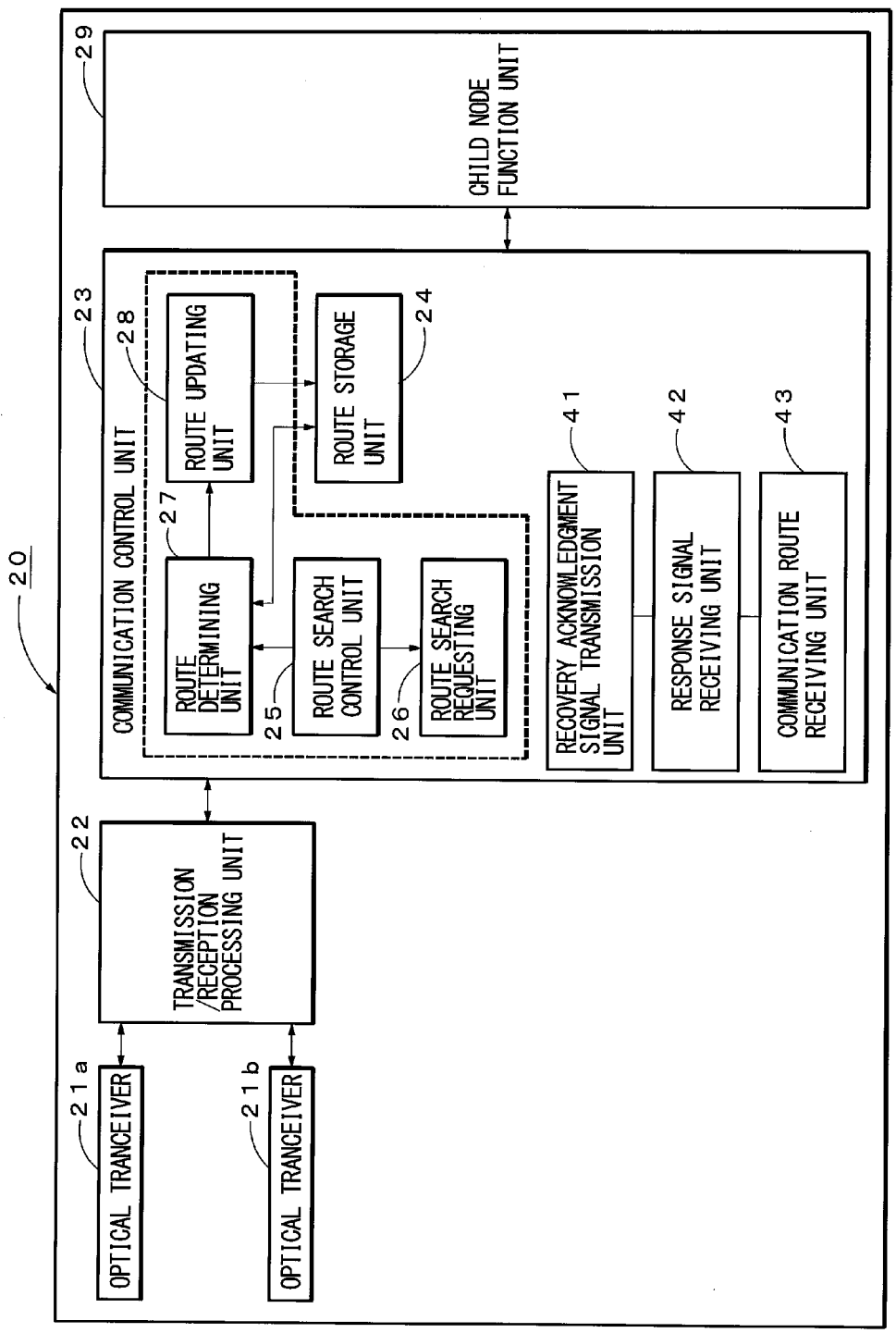
F I G. 2

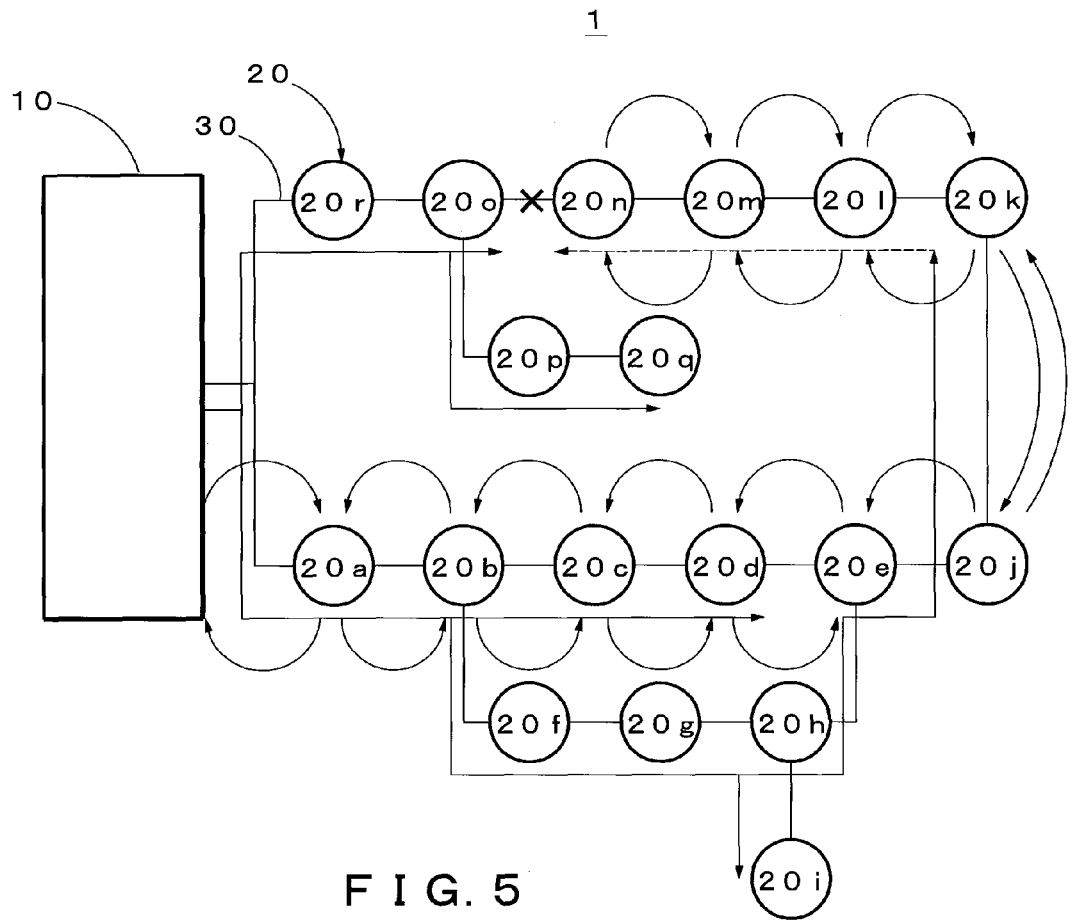
F I G. 5
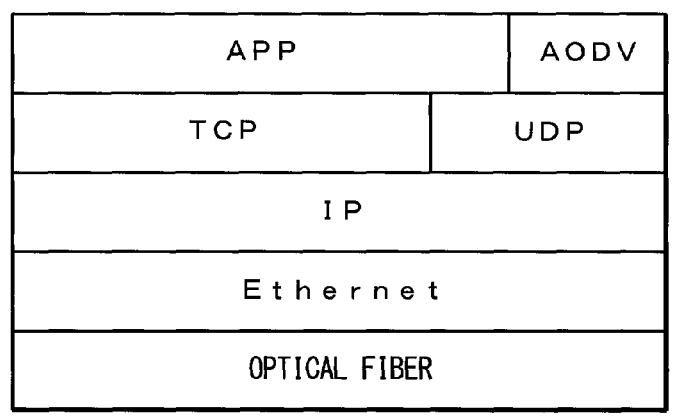
F I G. 11

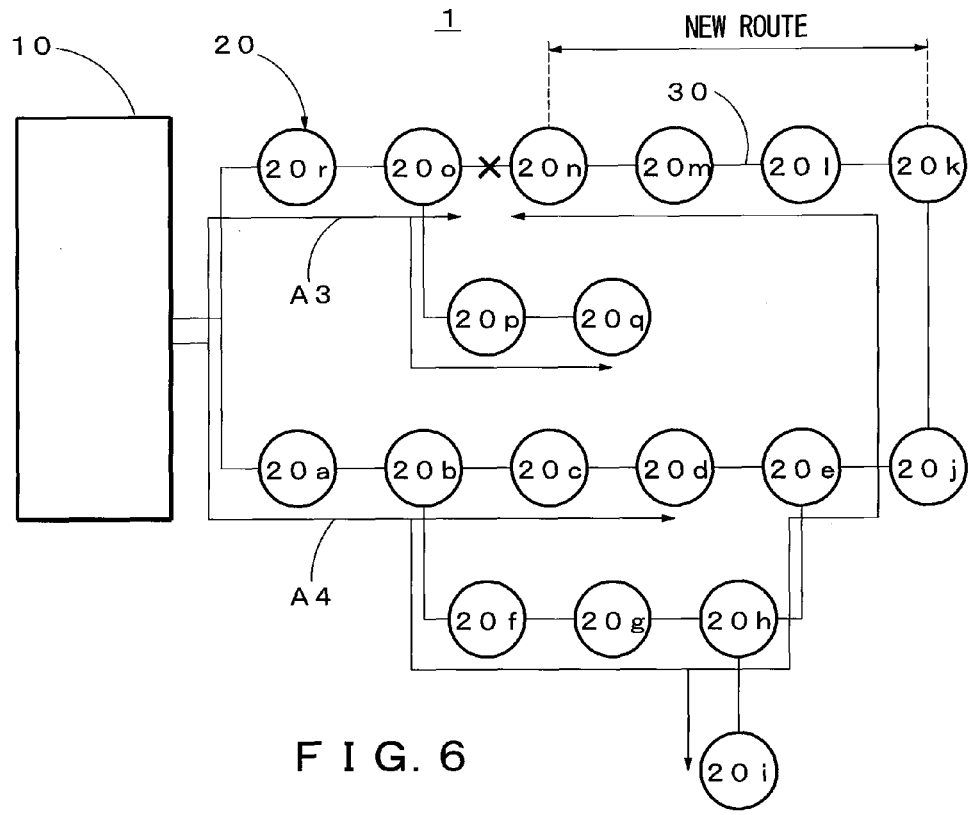
F I G. 6
| TARGET NODE | NEXT HOP NODE | PREVIOUS HOP NODE (option) | ROUTE COST |
|---|---|---|---|
| 50 | 60m | | 11 |
| 60l | 60l | | 2 |
| | | | |
| 60m | 60m | | 1 |
F I G. 13A
| TARGET NODE | NEXT HOP NODE | PREVIOUS HOP NODE (option) | ROUTE COST |
|---|---|---|---|
| 50 | 60o | 60m | 3 |
| 60o | 60o | 60m | 1 |
| | | | |
| 60l | 60m | 60o | 2 |
F I G. 13B

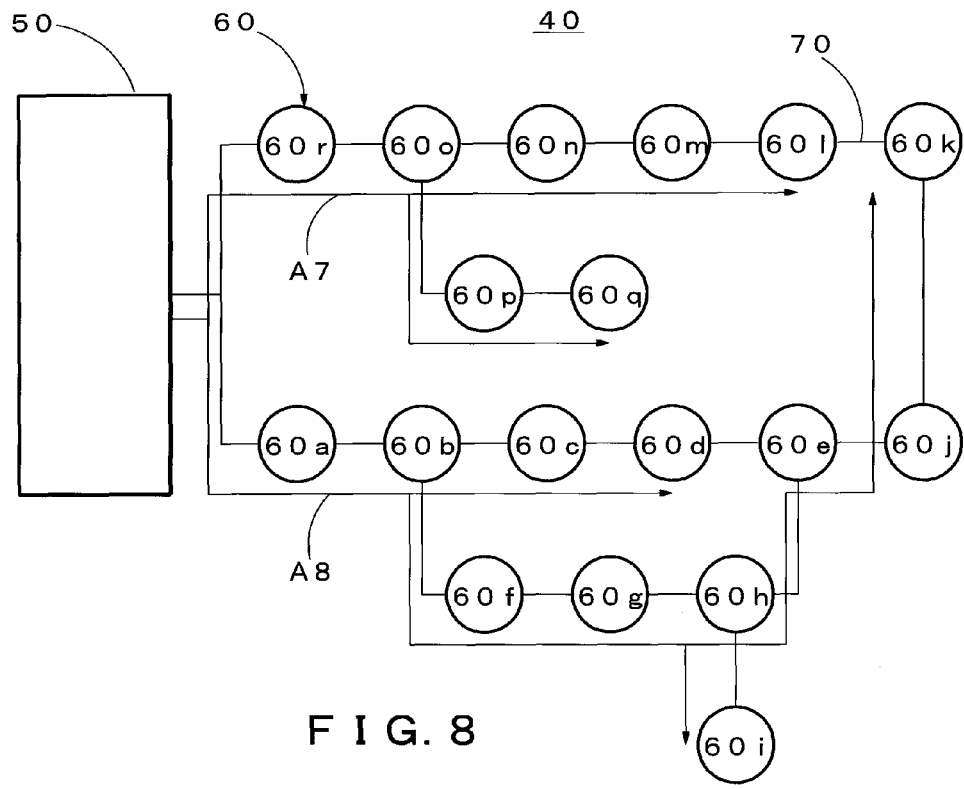
FIG. 8
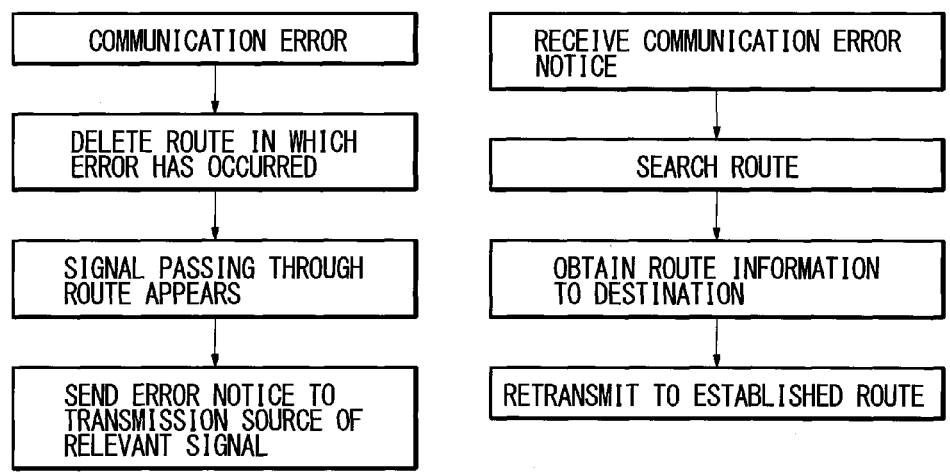
FIG. 14A
FIG. 14B

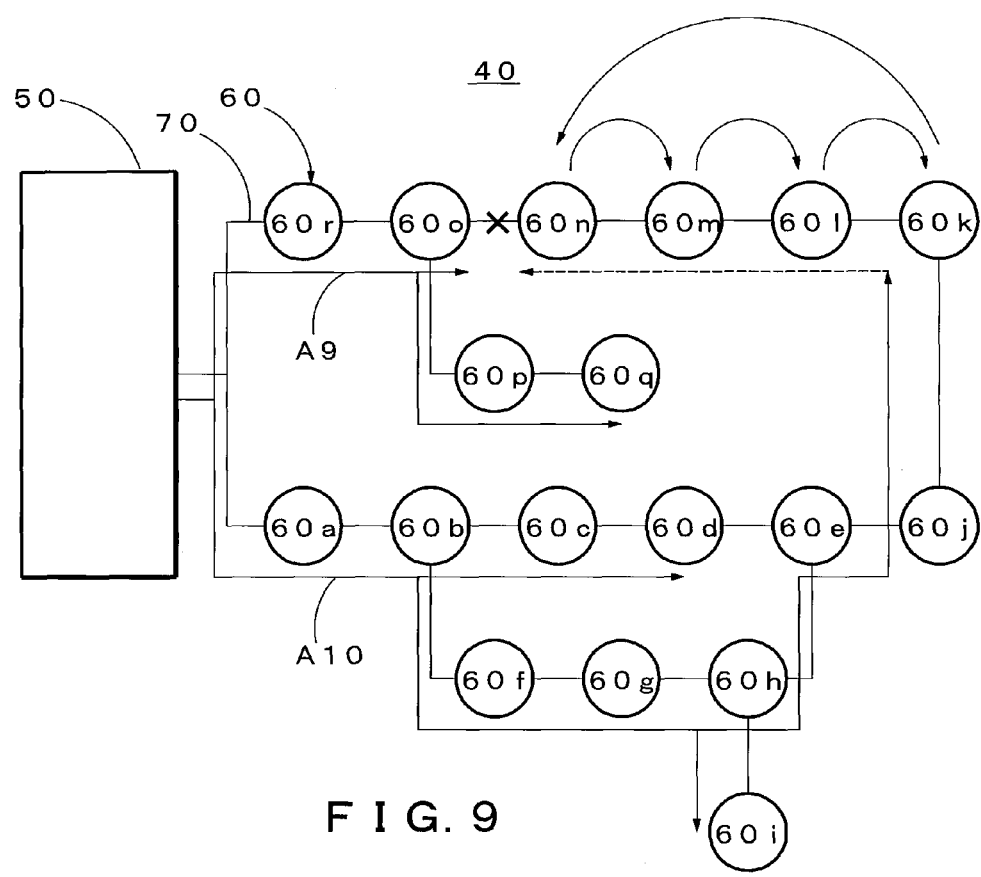
F I G. 9

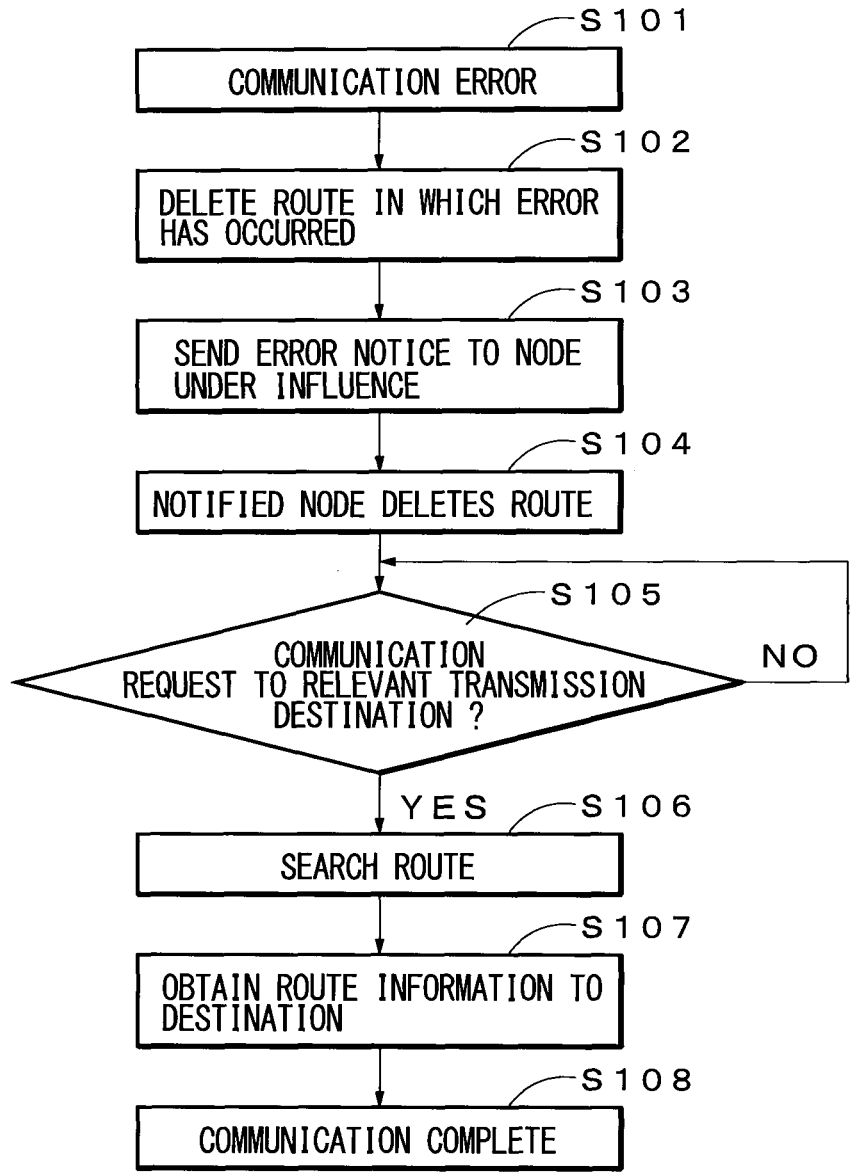
F I G. 10

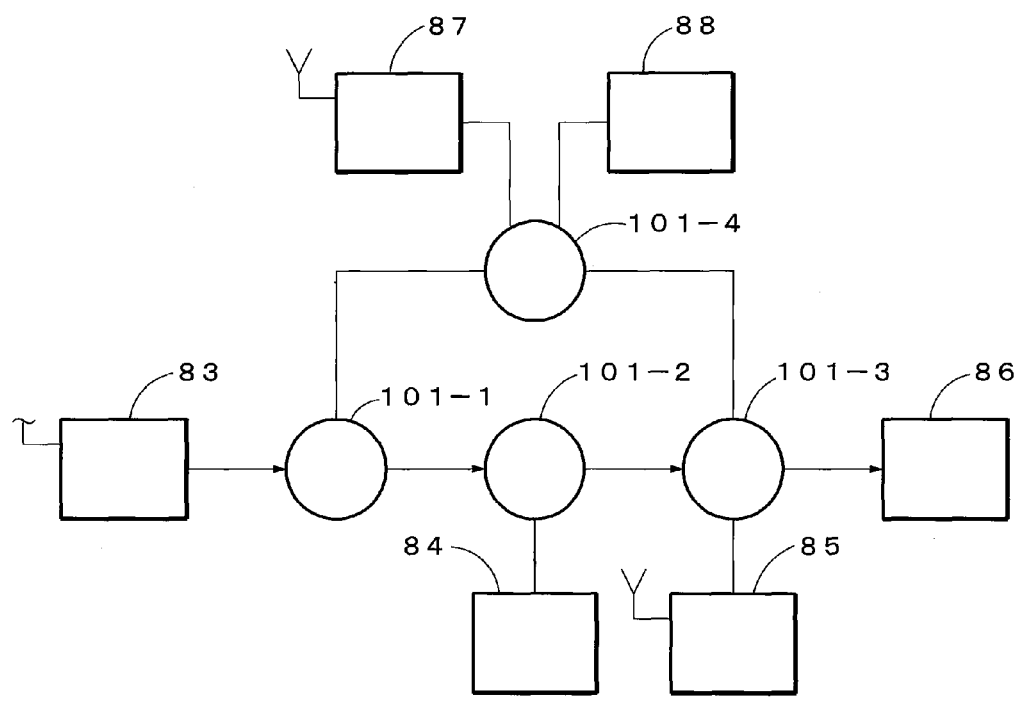
F I G. 1 5

COMMUNICATION SYSTEM, COMMUNICATION ROUTE CONTROL METHOD, AND COMMUNICATION APPARATUS

CROSS-REFERENCE TO RELATED APPLICATIONS

This is the National Stage of International Application No. PCT/JP2012/067851, filed Jul. 12, 2012, which claims the benefit of Japanese Patent Application No. 2011-153814, the disclosures of which are hereby incorporated by reference in their entireties.

TECHNICAL FIELD

The present disclosure relates to a communication system, a communication route control method and a communication apparatus that are desirable as a monitoring system of public facilities such as a power distribution system, and particularly relates to a communication system, a communication route control method and a communication apparatus that can automatically reset a communication route in case an error has occurred in an optical communication network.

BACKGROUND ART

A power distribution system control device and a smart meter concentration device are connected to a communication apparatus used for a communication system related to power distribution. The power distribution system control device is a device that controls a switch which is responsible for the switching between electric power distribution routes in a distribution line and voltage sensing, and implements a distribution line remote monitoring control system. The smart meter concentration device is a device that concentrates data from wattmeters installed in households and business facilities and that are capable of collecting information remotely. The communication network for power distribution plays a role of transmitting data to a data center, offices or the like of electric power companies.

Since such data relates to a steady supply of electric power and requires a high reliability, such data is often made redundant, and a communication route control system that switches between a plurality of communication routes is required for a communication system related to power distribution.

For example, a power distribution line remote monitoring control communication method that employs an IP (Internet Protocol) has been put to practical use. The network architecture of this method is a ring network in which nodes such as a parent node and child nodes are connected in a ring form, and redundancy is provided by a SW-HUB (switching hub). (For example, see Patent Documents 1 and 2).

DOCUMENT LIST

Patent Document(s)

Patent Document 1: Japanese Laid-Open Patent Publication No. 2005-210818
Patent Document 2: Japanese Laid-Open Patent Publication No. H7-31082

SUMMARY OF INVENTION

Technical Problem

However, with the aforementioned structure of the related art, since a protocol such as STP (spanning tree protocol) needs to be implemented in a node as a means to avoid data from being looped in an endless circulation, which results in an increase in man-hours for development, and since it is necessary to transmit BPDU (Bridge Protocol Data Unit) during a normal time, there is a drawback that a traffic is increased.

In a case where the device is expanded, the settings of the STP of the node located on an expanded communication route needs to be reviewed for optimization, and there is a drawback that modification of the settings becomes necessary in some cases. Further, with the protocol of STP, since a number of nodes is limited, there is a drawback that limitation is imposed on the construction of a network.

Particularly, in a case where STP is used, due to a manner in which STP is operated, there is a drawback that there is a time during which communication is not possible before the error is recovered. The time during which communication is not possible is almost not problematic in a normal network, but it is problematic in a network for remote monitoring/controlling of a power distribution line in which a real time response is of an importance.

It is an object of the present disclosure to provide a communication system, a communication route control method and a communication apparatus that can rapidly update a communication route at the time of an occurrence of an error.

Solution to Problem

In order to achieve the above object, a communication system of the present disclosure performs communication route control in which a spontaneous update of a communication route is carried out, the communication system including a center node and at least one node connected to the center node via a communication line,
the node including:
an error detecting unit that detects an error in the communication route;
a route request packet transmitting unit that broadcasts a new route request packet in response to the detection of the error;
a route answer packet receiving unit that receives a route answer packet transmitted from a node that is a target node or a node having a valid route to the target node or from the center node; and
a communication route updating unit that updates a communication route based on the route answer packet,
the node that is the target node or the node having a valid route to the target node or the center node transmitting a route answer packet to the node in response to a route request packet transmitted from the node.

The at least one node includes a first node that is located in a direct vicinity of the communication line in which the error has occurred or in a direct vicinity of another node in which the error has occurred, and a second node that is connected to the first node, the second node being a communication source of data,
the first node having
an error detecting unit that detects an error in the communication route, and
a signal transmitting unit that transmits a new error detection signal to the second node in response to the detection of the error,
the second node having
a signal receiving unit that receives an error detection signal transmitted from the first node, a communication route deleting unit that deletes a communication route in response to reception of the error detection signal, a route request packet transmitting unit that broadcasts a route request packet;

a route answer packet receiving unit that receives a route answer packet that receives a route answer packet transmitted from a node that is a target node or a node having a valid route to the target node or from the center node;

a communication route updating unit that updates a communication route based on the route answer packet, a node that is a target node or a node having a valid route to the target node or the center node transmitting a route answer packet to the second node in response to a route request packet transmitted from the second node.

Further, according to the communication system of the present disclosure, the error is one of an error in the optical fiber communication line and an error in another communication apparatus connected via the communication line, and the communication apparatus is one of a node that is located in a direct vicinity of the communication line in which the error has occurred and a node located in a direct vicinity of another node in which the error has occurred.

Further, the communication system of the present disclosure further includes a communication route deleting unit that deletes a communication route.

Further, the communication system of the present disclosure is used in a power distribution system.

Further, the communication system of the present disclosure further includes at least one of a smart meter and a power distribution system control unit that is provided in an externally communicable manner.

A communication route control method of the present disclosure is a control method of performing spontaneous update of a communication route, the method being applied to a plurality of communication apparatuses connected to each other via a communication line, the method including:

detecting an error in the communication route;

transmitting a route request packet in response to the detection of the error, the transmitting being broadcasting of a new route request packet;

receiving a route answer packet transmitted from a target node or a node having a valid route to the target node; and updating a communication route based on the route answer packet.

A communication route control method of the present disclosure is a control method of performing spontaneous update of a communication route, the method being applied to a communication route control system having a center node and at least one node connected to the center node via a communication line, the method including:

detecting an error in the communication route;

transmitting a route request packet in response to the detection of the error, the transmitting being broadcasting of a new route request packet;

transmitting a route answer packet to the node in response to a route request packet transmitted from the node;

receiving a route answer packet transmitted from a node or the center node that is a target node or a node having a valid route to the target node; and updating a communication route based on the route answer packet.

Further, the communication route control method of the present disclosure further includes deleting a communication route.

Further, a communication apparatus of the present disclosure is a communication apparatus that performs communication route control in which spontaneous update of a communication route is performed, the communication apparatuses being connected to each other via a communication line, the apparatus includes:

an error detecting unit that detects an error in a predetermined communication route;

a route request packet transmitting unit that broadcasts a new route request packet in response to the detection of the error;

a route answer packet receiving unit that receives a route answer packet transmitted from a target node or a node having a valid route to the target node; and a communication route updating unit that updates the predetermined communication route to another communication route based on the route answer packet.

Further, the error is one of an error in the optical fiber communication line and an error in another communication apparatus connected via the communication line, and the communication apparatus is one of a node that is located in a direct vicinity of the communication line in which the error has occurred and a node located in a direct vicinity of another node in which the error has occurred.

Further, the error is detected based on at least one of a LOS signal, an ACK signal, a NACK signal, a keepalive signal and a Dying Gasp signal.

The node may be a communication source node indicating a communication source of data and, in such a case, the error is detected based on Time Out.

Further, the communication apparatus of the present disclosure further includes:

a recovery acknowledgment signal transmitting unit that transmits a recovery acknowledgment signal at a predetermined timing, the recovery acknowledgment signal being for monitoring whether or not the predetermined communication route has recovered;

a reply signal receiving unit that receives a reply signal in response to the recovery acknowledgment signal; and a communication route recovering unit that carries out recovery by changing another communication route to the predetermined communication route in a case where the reply signal is received.

Further, the communication apparatus of the present disclosure further includes a communication route deleting unit that deletes a communication route.

Further, the communication apparatus of the present disclosure is used in a power distribution system.

Further, the communication apparatus of the present disclosure further includes at least one of a smart meter and a power distribution system control unit that is provided in a communicable manner with a node.

Advantageous Effects of Invention

According to the present disclosure, a route request packet is broadcast in response to the detection of an error in a predetermined communication route. Also, in a case where there was a request for updating a route, a route answer packet transmitted from a node that is a target node or a center node is received at another node (for example, a neighbor node) in response to a route request packet. Then, the predetermined communication route is updated to another communication route based on the route answer packet. Therefore, a multihop communication can be performed with another node, and a communication route can be updated quickly in case an error has occurred in the communication route. In other words, a communication system, a communication route control method and a communication apparatus can be provided that can eliminate an error at an early stage while maintaining the stability of communication.

BRIEF DESCRIPTION OF DRAWINGS

FIG. 1 is a diagram schematically showing a configuration of a communication system according to an embodiment of the present disclosure and predetermined communication routes therein.

FIG. 2 is a block diagram schematically showing a configuration of a node shown in FIG. 1.

FIG. 3 is a diagram showing an example of a communication route table stored in a route storage unit shown in FIG. 2.

FIG. 5 is a schematic diagram for explaining a communication route updating process of FIG. 4.

FIG. 6 is a diagram showing a communication route after having performed a communication route updating process of FIG. 4.

FIG. 8 is a schematic block diagram for explaining a communication route updating process performed by a communication system according to the second embodiment of the present disclosure.

FIG. 9 is another schematic diagram for explaining a communication route updating process performed by the present communication system.

FIG. 10 is a flow chart showing a communication route updating process according to the present embodiment.

FIG. 11 is a diagram showing a protocol stack for realizing a communication route updating process of FIG. 10.

FIG. 13A shows an example of a route table stored in a route storage unit of a child node after an update, and FIG. 13B shows an example of a route table stored in a route storage unit of a child node before an update.

FIG. 14A is a flow chart of a process of a child node for a case where an error notification is not positively sent to another node and an error packet is replied during communication, and FIG. 14B is a flow chart of a process in a transmission source for a case where an error notification is not positively sent to another node and an error packet is replied during communication.

FIG. 15 is a schematic diagram showing an example of a method of connecting a child node with a distribution control device and a smart meter concentration device.

FIG. 16 is a block diagram showing a configuration for a case in which a child node is provided integral with a smart meter concentration device or the like.

DESCRIPTION OF THE PREFERRED EMBODIMENTS

Figure 4:
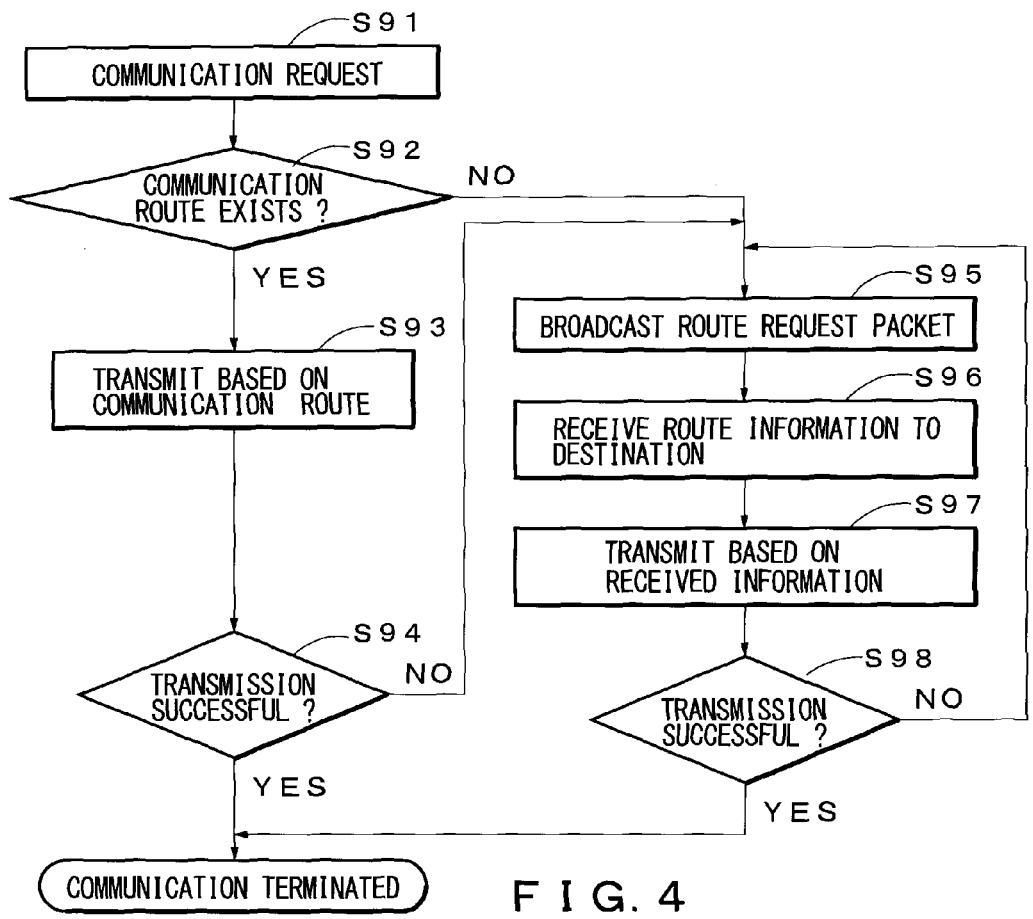
FIG. 4 is a flow chart showing an example of a communication route updating process performed in the node shown in FIG. 2.

Hereinafter, an embodiment of the present disclosure will be described in detail with reference to the accompanying drawings.

FIG. 1 is a diagram schematically showing a configuration of a communication system according to the present embodiment and predetermined communication routes therein.

In FIG. 1, the communication system that performs communication route control includes a center node 10 and a plurality of nodes 20a to 20q connected to the center node 10 via a communication line 30. In general, the center node 10 is installed in monitoring facilities such as electric power substations and the node 20 is installed to accompany a switch arranged along a distribution line. Each node is connected to a power distribution system control device that performs monitoring and controlling of the corresponding switch, and the center node performs wide-area monitoring and controlling of the power distribution system based on information from each node. The communication line 30 of the present disclosure includes, for example, an optical fiber cable and can achieve a large-capacity communication. Note that, the communication line is not limited to an optical fiber cable and may include a metal cable such as a coaxial cable.

Among the plurality of nodes 20a to 20q, two nodes 20a and 20r are connected to the center node 10. The nodes 20b to 20j are connected to the node 20a, and the nodes 20k to 20q are connected to the node 20r. Further, the node 20a and the node 20r are connected to each other, and the node 20j and the node 20k are connected to each other. Thus, the nodes 20a to 20e, 20j, 20k to 20o and 20r form a single loop.

The node 20o and the nodes 20p and 20q sequentially connected thereto form a branched route. The node 20b is connected to the nodes 20f to 20i, and since the node 20h is also connected to the node 20e, another loop is formed.

Arrows A1 and A2 in FIG. 1 show an example of the communication routes, and communication from the center node 10 to each node is achieved by the communication routes A1 and A2. A communication quality that is a condition for selecting the communication route may be, for example, determined in advance based on a required communication performance or the like, and can be preset to each node. Also, the communication quality can be set based on a number of relay nodes or a transmission and reception level or the like that are measured in real time.

With the communication route control system of the present embodiment, since each of the nodes 20 has a communication route table described below (see FIG. 3), it is configured such that a communication route to the center node and another node (hereinafter also referred to as a target node) can be selected in transmitting a signal. Further, it is configured in such a manner that, when a communication route to the target node is not set in the communication route table or when the communication route set in the communication route table is disconnected by an occurrence of an error such as an accident or a break down, the relevant node spontaneously updates the communication route to the target node. Here, after having updated the communication route, the original communication route may be stored or may be deleted.

FIG. 2 is a block diagram schematically showing a configuration of each node shown in FIG. 1.

In FIG. 2, the node 20 includes two optical transceivers 21a, 21b that communicate with the center node 10 and the node 20b that are neighboring thereto, a transmission/reception processing unit 22 connected to the optical transceivers 21a, 21b, a communication control unit 23 connected to the transmission/reception processing unit 22, and a node function unit 29 that performs a monitoring control process of a switch or the like to be monitored. Note that, in FIG. 2, the node 20 includes two optical transceivers 21a, 21b, but it is not limited thereto and may include three or more optical transceivers. For example, each of the nodes 20b, 20e, 20h and 20o in FIG. 1 includes three optical transceivers.

The communication control unit 23 has a route storage unit 24 that stores a communication route table for routing as shown in FIG. 3. In this communication route table, information regarding the center node 10 and the node 20 that are neighboring the relevant node 20 which becomes a first relay node to the target node (neighbor node information) and a communication cost of a communication route to the target node is set for each target node.

When data containing an IP address of the target node is outputted from the node function unit 29 to the communication control unit 23, the communication control unit 23 reads a communication route table from the route storage unit 24, selects target node information for routing (RA) using the communication route table, adds an address of the neighbor node (IP (1)) to the data and transmits it to the transmission/reception processing unit 22. The transmission/reception processing unit 22 further adds MAC information of the neighbor node to the data whereto the neighbor node address (IP (1)) has been added, selects the relevant optical transceiver, and outputs a signal. Also, when a signal to the node itself is received from one of the two optical transceivers 21a and 21b, the transmission/reception processing unit 22 outputs data with the neighbor node address to the communication control unit 23, and the communication control unit 23 outputs the data to the node function unit 29. Further, when a signal of other than the node itself is received from one of the two optical transceivers 21a and 21b, the communication control unit 23 confirms that the target node information for routing (RA) is not indicating the node itself, and thereafter replaces it with a neighbor address (IP (1)) for reaching the target node and transmits it to the transmission/reception processing unit 22. The transmission/reception processing unit 22 adds MAC information of the neighbor node from the neighbor address (IP (1)) information, selects the relevant optical transceiver, and outputs a signal.

Further, the node 20 has a communication route searching unit that spontaneously sets or updates the communication route to the target node at a time an error has occurred in the communication route such as a case where a communication route to a predetermined target node is not set in the communication route table or in a case where the communication route has been disconnected. The communication route search unit includes a route search control unit 25, a route search requesting unit 26, a route determining unit 27, and a route updating unit 28. Note that the node 20 may be provided with a communication route deletion unit that deletes the communication route in which an error has occurred.

The route search control unit 25 performs an overall control of the route search requesting unit 26, the route determining unit 27 and the route updating unit 28. The route search requesting unit 26 transmits a signal requesting for a search of a communication route at a predetermined timing. Also, the route search requesting unit 26 detects a signal which is in response to the searching request signal of the communication route or an error in the communication route, and broadcasts a route request packet via the optical transceiver 21 in response to the detection. Broadcast, as used herein, is a concept including a broadcast in IPv4 and all router multicast in IPv6. The route updating unit 28 receives a route answer packet transmitted by the node that is the target node that has received the route request packet or the center node, and updates the original communication route to another communication route based on the route answer packet. The route storage unit 24 is connected to the route updating unit 28 and stores the communication route table updated by the route updating unit 28. Here, the route updating unit 28 updates the communication route and thereafter, when storing the original communication route, stores the original communication route of the route storage unit 24, and when deleting the original communication route, deletes the original communication route of the route storage unit 24, and the updated communication route table is stored.

In a case where the node updates the communication route, since data for calculating a communication cost of a new communication route is necessary, in the present embodiment, each node possesses in advance the data necessary for calculating the communication cost. The cost of a communication route from each node to the target node may vary depending on a node that is relaying on the communication route. Accordingly, as data for calculating a communication cost of a communication route, each node possesses a communication cost between each node and a neighbor relay node.

In the present embodiment, in order that the node or the communication source detects an error in the communication route (or other nodes), detection is performed for LOS (Loss of Signal), non-arrival of an ACK signal, a NACK signal (provided that the ACK signal is implemented), a non-arrival of keepalive signal, a Dying Gasp signal, and Time Out in an upper layer.

LOS is processed by a physical layer or a layer conforming thereto, and non-arrival detection of the ACK signal and the NACK signal are processed by a MAC layer or a layer conforming thereto. The keepalive signal and the Dying Gasp signal are processed by the MAC layer or an IP layer or a layer conforming thereto. Also, the Time Out is processed by a TCP/UDP layer or an application layer or a layer conforming thereto.

The LOS, the non-arrival of ACK signal, the NACK signal, the keepalive signal and the Dying Gasp signal are detected by a node in a direct vicinity of an error. In the case of the LOS, only the presence or absence of light is determined, and if no light is received, it is determined to be an error. The ACK signal is a signal from the neighbor node which, when a signal is transmitted, indicates that the transmission signal has been normal, and when it does not arrive within a sufficient time after the transmission, it is determined to be an error. The NACK signal is a signal which is, as opposed to the ACK signal, transmitted when the neighbor node has detected an error in the signal when the signal was transmitted, and it is determined to be an error when it arrives. In the case of a keepalive signal, the keepalive signal is transmitted intermittently at a predetermined interval from each node, and if no keepalive signal is received from the neighborhood within a predetermined period, it is determined that there is a certain error in a neighbor node. The Dying Gasp signal is a signal that the node transmits to the neighbor node or the like immediately before it becomes impossible to recover by an error, and when it is detected, it is determined that an error has occurred in the neighbor node.

Regarding the Time Out in the upper layer, if there is no response (reply) within a predetermined period to a transmission of a signal that requires a reply within a predetermined time, it is determined that there is an error. Since the Time Out cannot be detected by the node in a direct vicinity of an error, an error will be detected by the communication source.

In the communication route searching unit of the node constructed as described above, the following two processes are mainly performed. First, a case in which the node function unit 29 outputs data containing the address of the target node to the communication control unit 23 or a case in which the transmission/reception processing unit 22 has received a signal directed other than the node itself from one of the optical transceivers 21 is considered. The communication control unit 23 searches for target node information for routing (RA) and a neighbor node address for making it possible to arrive at the target node from the communication route table for routing, and based on search results, performs transmission from the relevant optical transceiver 21 to the neighbor node via the transmission/reception processing unit 22. When relevant target node information for routing (RA) is not set in the communication route table, a communication route for arriving at the relevant target node information for routing (RA) is newly searched using the communication route searching unit, and a detected communication route is added to the communication route table.

In a case where it was possible to detect the target node information (RA) for routing of the transmission signal in a communication route table, the communication control unit 23 transmits a signal to the neighbor node connected to target node information for routing (RA) thus detected. In a case where it was not possible to transmit the signal to the neighbor node normally, the communication control unit 23 searches for another communication route to target node information for routing (RA) using the communication route searching unit. In a case where detection of the other communication route was successful by a communication route updating process to be described below, the communication route table is updated by resetting the communication route table with the detected other communication route, in stead of a communication route to target node information for routing (RA) which is set in the communication route table. At this time, the original communication route is deleted. Note that, the detection of the communication error can be performed not only by the neighbor node but also by the node that becomes a communication source of the signal.

FIG. 4 is a flow chart showing a communication route updating process performed in each node shown in FIG. 2.

First, when a communication request signal is inputted from an application layer which is an upper layer (step S91), the node looks up the communication route table and determines whether or not there is a communication route (step S92). If there is a communication route, transmission is made based on the communication route (step S93), and in a case where there is no communication route, the process proceeds to step S95.

Then, it is determined whether the transmission based on the communication route in the communication route table has been successful (step S94). That is to say, using one of the LOS, the non-arrival of ACK signal, the NACK signal, the non-arrival of keepalive signal and the Time Out in the upper layer, it is determined whether or not an error in the communication route has been detected. In a case where the transmission was successful, communication is terminated.

On the other hand, when there is no communication route (NO in step S92), or when transmission was not successful (NO in step S94), a route request packet is broadcast (step S95). The route request packet transmitted by the node arrives at the center node (target node) through one of the routes established by the communication route control system. Then, upon reception of the route request packet, the center node transmits a route answer packet to the node that has transmitted the route request packet. The node receives the route information to the destination by receiving the route answer packet (step S96), transmits based on the received route information (step S97), and the communication route is thereby updated. Then, it is determined whether or not the transmission performed based on the received route information has been successful (NO in step S98), and when the transmission was not successful, the process returns to step S95 and when it was successful, the communication is terminated.

Note that, in the aforementioned communication route updating process, a simple step, such as establishing a new route by receiving a route answer packet (step S96), may be performed.

A specific example of the communication route updating process of FIG. 4 will be described with reference to FIG. 5. Referring to FIG. 5, a case in which the node 20n performs a communication route updating process will be described as an example for a case where an error has occurred between the nodes 20n and 20o.

First, upon detection of a connection error of the node 20o by the LOS, NACK signal, or the like, the node 20n transfers (broadcasts) a route request packet to the surroundings and the node 20m receives the route request packet. The node 20m in turn transmits the route request packet to the node 20l. Subsequently, the nodes 20k, 20j, 20e, . . . , transfer the route request packet in turn to transmit the route request packet to the center node (target node). The center node and the nodes transfer a route answer packet in turn along a route opposite to the route along which the route request packet was transmitted. When the route answer packet arrives at the node 20n, a new communication route is established that extends from the center node to the node 20k via the node 20n. The communication route from the center node 10 to the node 20n is updated by this process.

Note that, there may be a case where the center node 10 receives a plurality of route request packets, but it is desirable to transmit the route answer packet to only an optimum route based on the number of nodes passed (number of hops), the communication cost, etc.

After the communication route updating process of FIG. 5 has been performed, the communication route becomes as shown in FIG. 6. That is to say, the communication routes A1 and A2 from the center node 10 to each node (FIG. 1) are changed to communication routes A3 and A4 by establishing a new route from the node 20k to the node 20n.

Note that, the aforementioned communication route updating process relates to a case where it is performed by the node 20n, namely a node in a direct vicinity of an error, but it is not limited thereto, and may be performed by a communication source node (hereinafter, simply referred to as a "communication source"), which is a communication source of data.

In a case where the communication source performs the communication route updating process, the node in a direct vicinity (first node) transmits an error signal (error detection signal) to be described below to the communication source (second node). The communication source detects an error by receiving a relevant error notice, and broadcasts a route request packet in response to the reception of the error notice. Upon reception of a route request packet, the center node transmits a route answer packet to the communication source. Then, the communication source receives a route answer packet transmitted by the node that is the target node or the center node and updates the communication route based on the route answer packet. Thereby, a process similar to the communication route updating process of FIG. 5 is performed.

(Entity that Updates a Communication Route)

Figure 7:
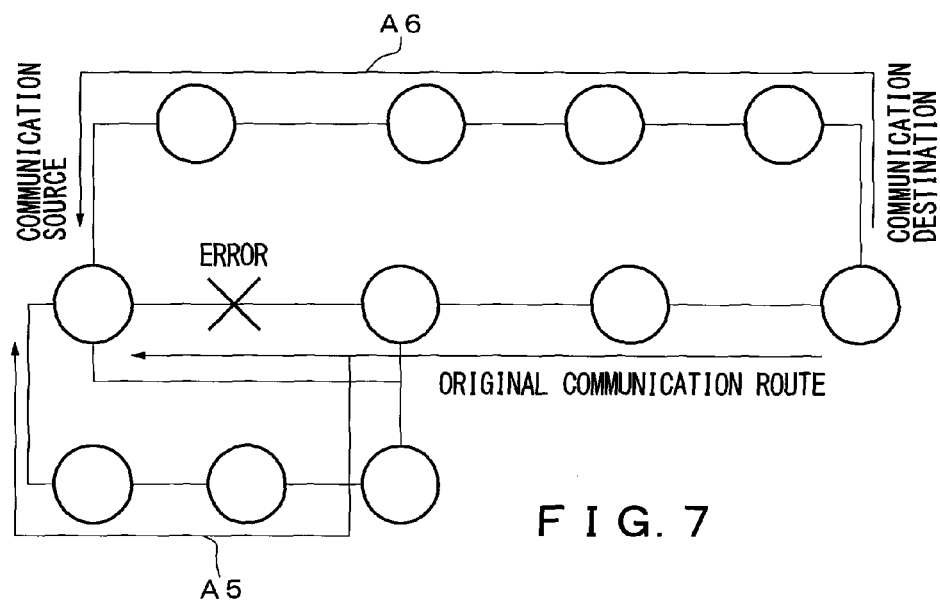
FIG. 7 is a diagram for explaining an entity that performs a communication route updating process of the present embodiment.

FIG. 7 is a diagram for explaining an entity that performs a communication route updating process of the present embodiment.

In the present embodiment, as has been described above, a node in a direct vicinity of an occurrence of an error and a communication source are configured as the two entities performing the present process, and an update route and an update time vary depending on a difference in the entities of the present communication route updating process. For example, in FIG. 7, in a case where the node in a direct vicinity of the error performs an update, an error can be detected within a short period of time, but there may be a case where a route after the updating is not an optimum route (A5). On the other hand, in a case where the communication source performs an update, error detection is performed relatively slow, but an optimum route is selected (A6). Therefore, depending on a position where the communication route is installed, a situation of the error, or the like, one of the node in a direct vicinity and the communication source can be configured as an entity that updates the route. Also, it is possible to configure in such a manner that, at first, the node in a direct vicinity rapidly updates the route and thereafter the communication source optimizes the route at an appropriate timing.

(Recovering Process Performed after a Route Updating Process)

In a state where there is no error in the communication route of the present communication system, the original communication route is normally optimal. Accordingly, when the error has been removed and remedied after the communication route updating process, it is possible to perform a process of returning to the original communication route.

In the present embodiment, the node 20 is further provided with a recovery acknowledgment signal transmitting unit 41 that transmits, at a predetermined timing, a recovery acknowledgment signal for monitoring whether or not the original communication route has recovered, a response signal receiving unit 42 that receives a response signal in response to the recovery acknowledgment signal, and a communication route recovering unit 43 that performs a recovery, upon reception of the response signal, by changing the other communication route to the original communication route (FIG. 2).

As a recovering process performed in the node 20, for example, a performing entity of the updating process (node in a direct vicinity or communication source) transmits a re-route signal (recovery acknowledgment signal) at a predetermined time interval. In a case where the error has already been removed and improved, a response signal is transmitted from the neighbor node that has not been able to communicate until then due to an occurrence of an error. Then, upon reception of the response signal, the performing entity of the updating process determines that the original communication route which was previously used is available for communication and changes the communication route to the original communication route. Accordingly, the recovering process can be performed in a simple manner.

Note that the aforementioned recovering process may also be performed at a predetermined timing by the center node 10. In such a case, the center node 10 has a recovery acknowledgment signal transmitting unit that transmits, at a predetermined timing, a recovery acknowledgment signal for monitoring whether or not the original communication route has recovered, and a response signal receiving unit that receives a response signal in response to the recovery acknowledgment signal, and in a case where a response signal is received, a recovery instruction signal for instructing the recovery of the communication route is transmitted to the node or the transmission source.

As set forth above, according to the present embodiment, a route request packet is transmitted to the node or the center node (target node) in response to detection of an error in a predetermined communication route. In response to the route request packet, a route answer packet transmitted from the node or the center node that becomes the target node is received. Then, the predetermined communication route is updated to another communication route based on the route answer packet. Therefore, a multihop communication can be performed with another device, and, in a case where an error has occurred in the communication route, the communication route can be rapidly updated.

After the updating of the communication route, the recovery acknowledgment signal is transmitted at a predetermined timing, and when a response signal in response to the recovery acknowledgment signal is received, a recovery to the original communication route is performed. Thereby, the recovering process can be performed in a simple manner and rapidly.

FIGS. 8 and 9 are schematic diagrams for explaining a communication route updating process performed by a communication system according to the second embodiment of the present disclosure, and FIG. 10 is a flow chart showing a communication route updating process according to the present embodiment.

The communication system 40 of FIG. 8 includes a single parent node (corresponds to the center node) 50 and child nodes 60a to 60r, and communication is performed between the parent and child nodes using communication routes A7 and A8. For example, the child node 60h communicates with the parent node 50 via the child nodes 60a, 60b, 60f and 60g, and the child node 60q communicates with the parent node 50 via the child nodes 60r, 60o and 60p. When an error occurs in the communication route, a route switching procedure is performed. The detection of an error is performed using the LOS, the non-arrival of the keepalive signal or the like.

For example, when the child node 60n fails to communicate with the parent node 50, the child node 60n detects a communication error (step S101), and the communication route between the child nodes 60n and 60o in which an error has occurred is deleted (step S102). The child node 60n memorizes a node that has used between the child nodes 60n and 60o, and notifies of the occurrence of an error to both of the child nodes 60m and 60l (node under influence that becomes unavailable for communication) (step S103), and both of the child nodes 60m and 60l delete routes (step S104). Then, in a case where a communication request with the parent node 50 is generated in each node of the child nodes 60n and 60o (YES in step S105), since there is no communication route to the parent node 50, a route request packet is broadcast and a new communication route is searched (step S106). In the case of FIG. 8, when a communication request is generated in the child node 60n, since the communication route to the parent node is blocked, the child node 60n broadcasts a route request packet, and then the child nodes 60m and 60l sequentially performs the broadcasting, and the child node 60k receives the route request packet.

The child node 60k has a valid route to the parent node 50 stored therein, and transmits a route answer packet to the child node 60n. When this route answer packet arrives at the child node 60n, the child node 60k acquires new communication route information to the parent node 50 (step S107). As a result, a new communication route via the child node 60k is established (step S108).

FIG. 11 is a diagram showing a protocol stack for realizing a communication route updating process of FIG. 10. In a case where an AODV (Ad hoc On-Demand Distance Vector) is used, the architecture is the same as the stack of a normal TCP/IP over Ethernet, and an AODV signal operates on a specific port of UDP.

This AODV signal operates on the UDP and creates a route table to be described below in L3. Thereafter, in L3, a transfer is performed by looking up the route table.

Figure 12:
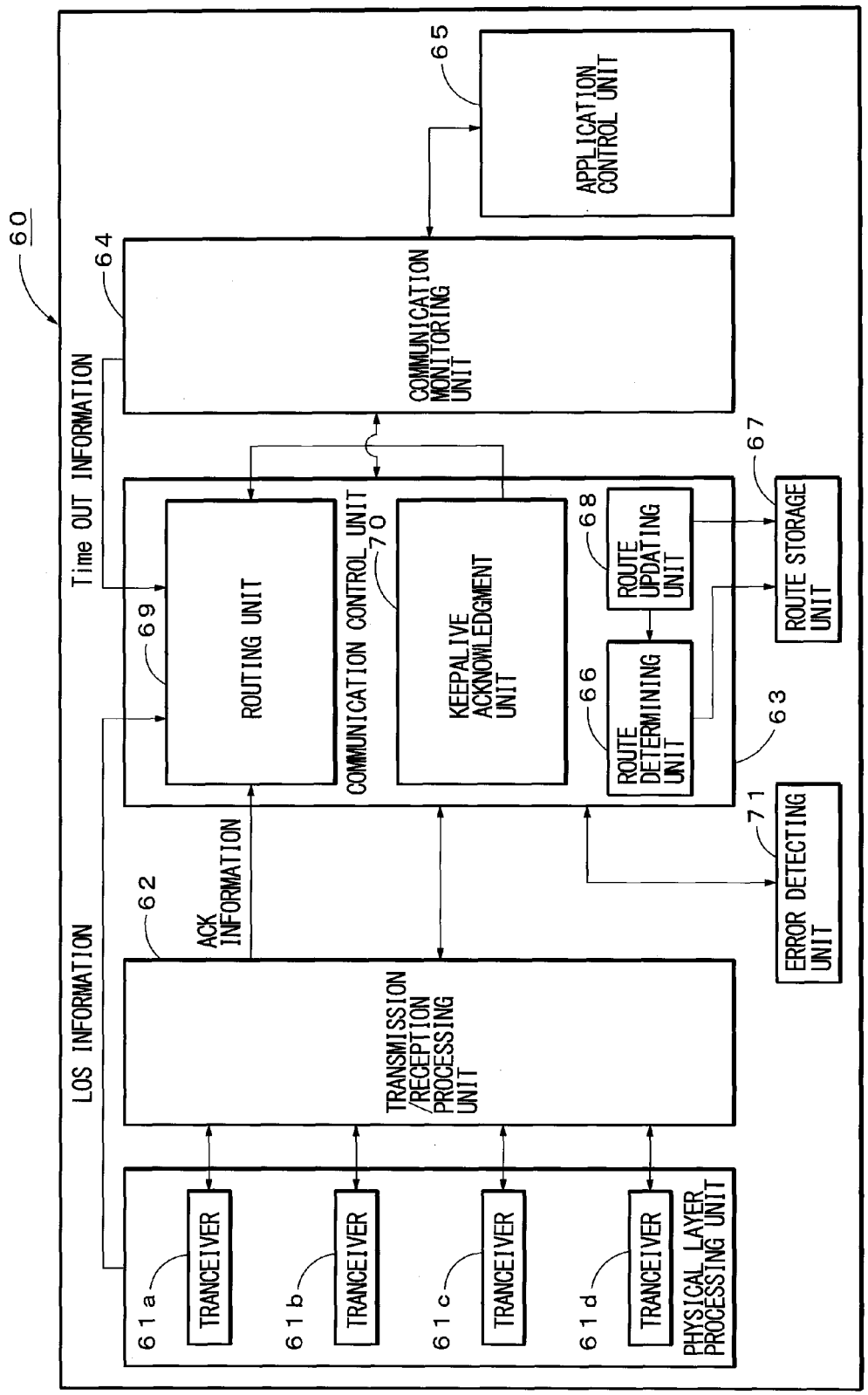
FIG. 12 is a block diagram schematically showing a structure of each child node.

FIG. 12 is a block diagram schematically showing a structure of each child node.

In the child node 60 in FIG. 12, a signal is received from outside by transceivers 61a to 61d (metal transceivers or optical transceivers) and arrives at a communication control unit 63 via a transmission/reception processing unit 62. Each transceiver is connected to a neighbor node or to a power distribution control device and a concentrator of a smart meter. The signal inputted into the communication control unit 63 is determined in the communication control unit as to whether or not a destination is known. When the destination is known, a route determining unit 67 sends out, to the transmission/reception processing unit 62, a signal whereto information on the next hop node or the like is added. Based on next hop node information, the transmission/reception processing unit 62 performs transmission to a transceiver that is appropriate as a transmission destination. The transceivers may be of any combination and number.

In a case where a route is unknown, a route is searched by an operation of the routing unit 66, and the next hop node information is obtained. Then, the route updating unit 68 adds data to the route storage unit 67, and the next hop node information is delivered to the transmission/reception processing unit 62 and-transmission to an appropriate transceiver is performed.

Further, each node 60 has an error detecting unit 71 and it is possible to monitor errors in the surroundings. In a case where the error detecting unit 71 has detected errors in the surroundings, two types of methods described below can be used.

(1) Case where Communication is Not Performed in Advance

When the error detecting unit 71 detects an error, the communication route in which the error has occured is deleted. After the deletion of the communication route, in a case where communication that attempts to use the relevant communication route occurs, an error is notified to the transmission source. Upon reception of an error notice, the transmission source deletes the communication route and searches for a route again.

(2) Case where Communication is Performed in Advance

Upon detection of an error, the error detecting unit 71 deletes the route in which an error has occurred and also notifies of an error across a range under influence based on previous node information that was using a route stored in advance. The informed node deletes the route. In a case of a new communication, since the route determining unit 66 determines that it is an unknown target value, a route search is performed.

FIGS. 13A and 13B show an example of a route table stored in the route storage unit 67 of the child node 60n. FIG. 13B is an example of a table for a case in which a previous node and a line are showing normal behaviors, and a next hop corresponding to some communication purpose nodes is illustrated. For example, it can be seen that when the target node is 50, a signal is transmitted to the node 60o, and when the target node is 60l, a signal is transmitted to the node 60m. Here, in a case where an error has occurred between the nodes 60m and 60n, since it is not possible to use a route between nodes 60o and 60n, a route changing procedure is performed. As a result of performing the route modification procedure of the present embodiment, the route table shown in FIG. 13B is changed into the route table shown in FIG. 13A, and, among the next hop node, the previous hop node and the route cost, a relevant item is updated. The communication control unit 68 sends out a signal to the transmission/reception processing unit 62 based on the updated route table.

A method of detecting an occurrence of an error or a failure in the communication route differs depending on an element (trigger) for determination of error detection. Specifically, LOS means that a physical signal is lost and it is detected in the transceiver 61a to 61d and notified to the routing unit 69.

ACK is a reply indicating that the transmitted signal has arrived properly and is processed in the transmission/reception processing unit 63. In a case where ACK is not replied within a predetermined time, it is determined that the signal did not arrive properly, and the routing unit 69 is notified of an error. NACK is, similarly to ACK, a signal processed in the transmission/reception processing unit 63, and indicates that an improper signal has arrived. In a case where this signal has arrived, the routing unit 69 can be notified of an error.

The keepalive signal is a signal that is notified to the surroundings periodically by a keepalive acknowledgment unit 70 in the communication control unit 63 and indicates that the transmission source is normal. In a case where the keepalive signal does not arrive within a predetermined time, it is determined that there is an error in the target node and the routing unit 69 is notified of the error. Also, the keepalive signal contains information such as a MAC address and an IP address, and when there is a change in such information, the routing unit 69 can be notified of an error.

Time out is an upper layer function such as TCP that is detected by the communication monitoring unit 64. A protocol for acknowledging an arrival of the signal to the transmission destination may be incorporated in an upper layer function represented by TCP, and in a case where an arrival of the signal was not acknowledged within a predetermined time, the routing unit 69 is notified of an error. Since this function is performed in an upper layer, the detecting entity is not in a direct vicinity of the error but rather the transmission source.

Although LOS determines an error most rapidly, it cannot deal with a case in which there is a continuous transmission of signals but contents there of are not normal. Accordingly, it is normally desirable to combine two or more types of detection methods.

Note that, all of these error detection method may be implemented, or only a part of the may be implemented.

FIG. 14A is a flow chart of a process of a child node for a case where an error notification is not positively sent to another node and an error packet is replied during communication, and FIG. 14B is a flow chart of a process in a transmission source for a case where an error notification is not positively sent to another node and an error packet is replied during communication.

As shown in FIG. 14A, the child node that performs error detection notifies the transmission source of detection of an error in a case where a signal passing the route has arrived. Therefore, since the child node need not manage to which node the error should be notified, a simple configuration is possible. On the other hand, as shown in FIG. 14B, the transmission source that has received a communication error notice from the child node obtains, after the route search, route information to a destination and retransmits the signal to the relevant route. That is to say, in the communication source, since an error is not notified if transmission is not performed, the switching becomes retarded and an increased communication will occur.

In the present embodiment, communication is performed between a parent node and a child node, but communication may also be performed between child nodes. The communication method between the child nodes is the same as the communication method between the parent node and the child node.

Hereinafter, an example of a connection method between a child node and a power distribution control device or a smart meter concentration device will described with reference to FIG. 15.

FIG. 15 illustrates that a predetermined port of each of child nodes (communication apparatus) 100-1 to 100-4 is connected to a smart meter concentration device and/or a power distribution system control device. Also, each child node is connected to a neighbor node using another port. Each child node may be connected to both of the smart meter concentration device and the power distribution control device (child node 100-4), may be connected to the smart meter concentration device only or to the power distribution system control device only (child nodes 100-2 and 100-3), or may be a child node which is specialized in information transfer and connected to none of them (child node 100-1). Information of each of smart meter concentration devices 83, 85 and 87 and power distribution control devices 84 and 88 is transferred to the transmission source of a management server 86 or the like by a communication control unit of each child node.

The smart meter concentration device has functions of collecting and managing various information such as electric power supplied to the child node and of performing transmission and reception with an external device such as a server. Also, the power distribution control device has a function of controlling an electric power to be supplied to the child node.

Figure 16:
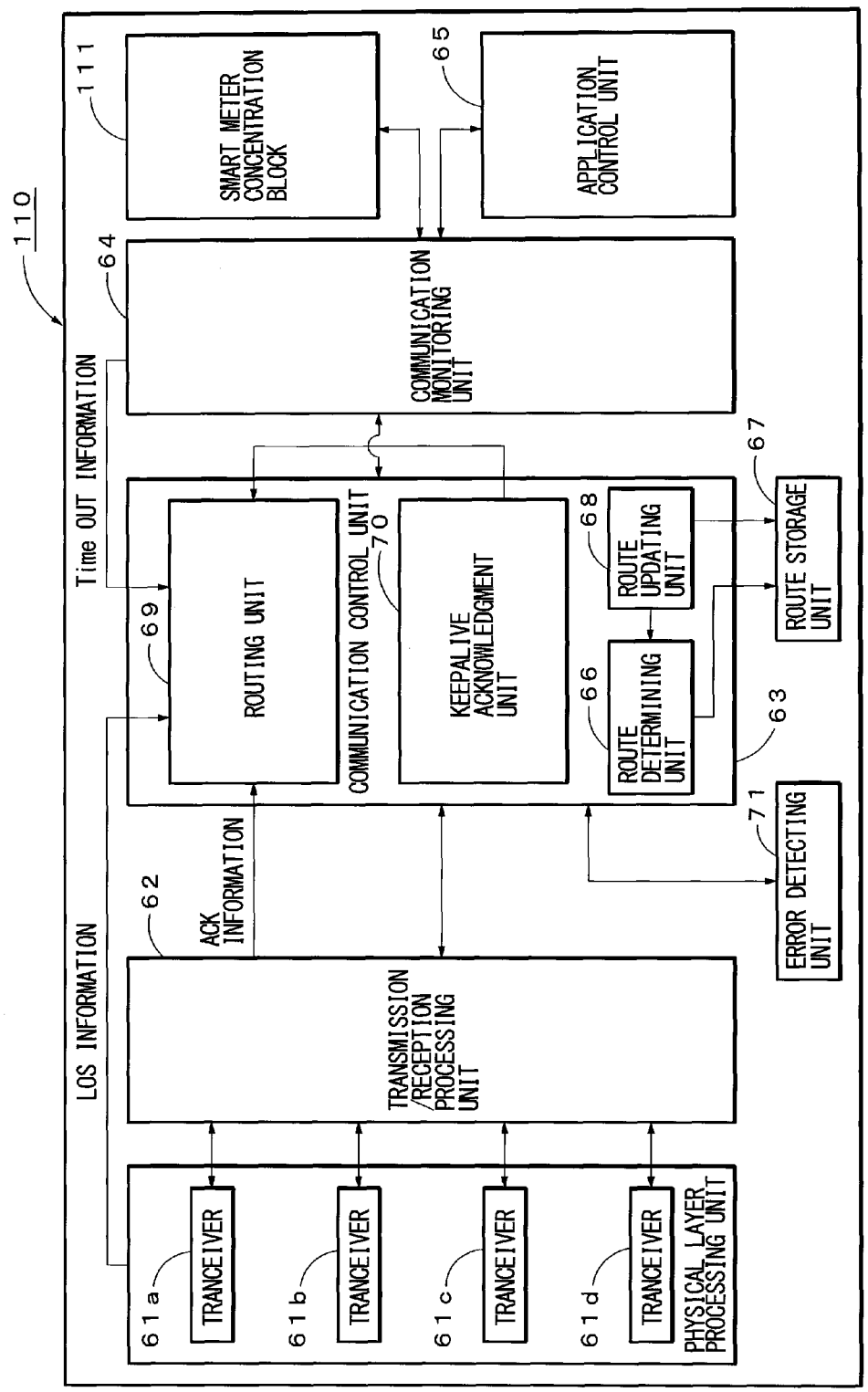

Note that, the child node of the present disclosure may be provided integral with a smart meter concentration device or a power distribution control device. In such a case, as illustrated in FIG. 16, the application control unit 65 of a child node 110 and a smart meter concentration block 111 are connected in parallel, and a signal necessary for the application control unit 65 and a signal necessary for the power distribution system control block 111 are distinguished in the communication monitoring unit 64, and transmitted respectively. The smart meter concentration block 111 may also have a function of performing a power distribution control, or the power distribution system control unit may be, separate from the smart meter concentration block, provided in the child node.

In the aforementioned embodiment, one of the LOS, the ACK signal, the NACK signal, the keepalive signal and the Time Out is used to determine whether or not an error in the communication route has been detected, but it is not limited thereto. It may be configured to detect at least two of the LOS, the ACK signal, the NACK signal, the keepalive signal and the Time Out, and, when any of the LOS, the ACK signal, the NACK signal, the keepalive signal and the Time Out is detected, it can be determined whether or not an error exists in the communication route.

The aforementioned embodiment shows an example the communication system and the communication apparatus of the present disclosure, and but it is not limited thereto. For example, aforementioned embodiment may be applied not only to the power distribution system illustrated above, but may also be to a monitoring system of public facilities such as road monitoring, railroad monitoring, water, sewage and river monitoring or other communication systems. Also, detailed configuration of the node of the communication apparatus or the communication system of the present embodiment can be appropriately modified without departing from a spirit of the present disclosure.

LIST Of REFERENCE SIGNS 1 communication route control system
10 center node
20 node
21a, 21b optical transceiver
22 transmission/reception processing unit
23 communication control unit
24 route storage unit
25 route search control unit
26 route search requesting unit
27 route determining unit
28 route updating unit
29 node function unit
41 recovery acknowledgment signal transmitting unit
42 response signal receiving unit
43 communication route recovery unit

The invention claimed is:

1. A communication system adapted to perform communication route control in which a spontaneous update of a communication route is carried out, the communication system comprising a center node and a plurality of nodes connected to the center node via a communication line,
wherein the plurality of nodes include a first node that is located neighboring a communication line in which an error has occurred or is located neighboring another node in which an error has occurred, and a second node that is connected to the first node and different from the first node, the second node being a communication source,
the first node having:
an error detecting unit adapted to detect an error in the communication route;
a communication route deleting unit adapted to delete the communication route in which the error has occurred in response to the detection of the error; and
a signal transmitting unit adapted to transmit an error detection signal to the second node in response to a communication request of the second node to a target node from an upper layer,
the second node having:
a signal receiving unit adapted to receive the error detection signal transmitted from the first node;
a communication route deleting unit adapted to delete the communication route in which the error has occurred in response to reception of the error detection signal;
a route request packet transmitting unit adapted to broadcast a route request packet in response to reception of the error detection signal;
a route answer packet receiving unit adapted to receive a route answer packet transmitted from a node of the plurality of nodes that is to be the target node or from the center node; and
a communication route updating unit adapted to update a communication route of the second node to another communication route not including the communication route deleted based on the route answer packet,
wherein said node that is to be the target node or the center node is adapted to transmit the route answer packet to the second node in response to the route request packet transmitted from the second node.

2. The communication system according to claim 1, wherein the communication line is an optical fiber communication line,
the error is one of an error in the optical fiber communication line and an error in another communication apparatus connected via the communication line.

3. The communication system according to claim 1, wherein the communication system is used in a power distribution system.

4. The communication system according to claim 3, further comprising at least one of a smart meter and a power distribution system control unit that is adapted to communicate with an external device.

5. A communication route control method of performing spontaneous update of a communication route, the method being applied to a communication route control system having a center node and a plurality of nodes connected to the center node via a communication line, the method comprising:
   detecting an error in the communication route, the detecting being performed by a first node that is located neighboring a communication line in which an error has occurred or is located neighboring another node in which an error has occurred;
   transmitting a route request packet in response to the detection of the error, the transmitting being broadcasting of a new route request packet, the transmitting being performed by a second node that is connected to the first node and different from the first node, the second node being a communication source;
   transmitting a route answer packet to the second node in response to a route request packet transmitted from the second node, the transmitting is performed by a node that is to be a target node or the center node;
   receiving a route answer packet transmitted from the node that is to be the target node or from the center node, the receiving is performed by the second node; and
   updating a communication route based on the route answer packet, the updating is performed by the second node.

6. The communication route control method according to claim 5, further comprising deleting a communication route.

7. A communication apparatus adapted to perform communication route control in which spontaneous update of a communication route is performed, the communication apparatuses being connected to each other via a communication line,
   wherein the communication apparatus is a second node that is connected to a first node and different from the first node, the first node being located neighboring a communication line in which an error has occurred or is located neighboring another node in which an error has occurred, the second node being a communication source,
   the second node having:
   a signal receiving unit adapted to receive the error detection signal transmitted from the first node;
   a route request packet transmitting unit adapted to broadcast the route request packet in response to a reception of the error detection signal;
   a route answer packet receiving unit adapted to receive a route answer packet transmitted from a node that is to be the target node or from the center node; and
   a communication route updating unit adapted to update a communication route of the second node based on the route answer packet.

8. The communication apparatus according to claim 7, wherein
   the communication line is an optical fiber communication line,
   the error is one of an error in the optical fiber communication line and an error in another communication apparatus connected via the communication line.

9. The communication apparatus according to claim 7, further comprising:
   a recovery acknowledgment signal transmitting unit adapted to transmit a recovery acknowledgment signal at a predetermined timing, the recovery acknowledgment signal being for monitoring whether or not the predetermined communication route has recovered;
   a reply signal receiving unit adapted to receive a reply signal in response to the recovery acknowledgment signal; and
   a communication route recovering unit adapted to carry out recovery by changing another communication route to the predetermined communication route in a case where the reply signal is received.

10. The communication apparatus according to claim 7, further comprising a communication route deleting unit adapted to delete a communication route.

11. The communication apparatus according to claim 7, wherein the apparatus is used in a power distribution system.

12. The communication apparatus according to claim 11, further comprising at least one of a smart meter and a power distribution system control unit that is adapted to communicate with the second node.

13. A method comprising:
   receiving a route request packet from an adjacent node among a plurality of nodes in a multihop network, the route request packet transmitted by a source node among the plurality of nodes in response to receiving an error detection signal from another node among the plurality of nodes neighboring a communication line in which an error has occurred;
   transmitting the route request packet in a first direction of a communication route in the multihop network to a target node among the plurality of nodes;
   in response to the route request packet, receiving a route answer packet from the target node in a second direction of the communication route, the first and second directions being opposite directions of the communication route;
   updating a communication route table based upon the route answer packet; and
   transmitting the route answer packet to the source node in the second direction,
   wherein the source node is adapted to update a source communication route table based on the route answer packet.

14. The method of claim 13, wherein the target node is an intended recipient of a communication from the source node.

15. The method of claim 13, wherein the target node is a central node of the multihop network.

* * * * *